(12) United States Patent
Martin et al.

(10) Patent No.: US 10,989,600 B2
(45) Date of Patent: Apr. 27, 2021

(54) AUTOMATED METHODS AND SYSTEMS TO FILL BACKGROUND AND INTERSTITIAL SPACE IN A VISUAL OBJECT LAYOUT

(71) Applicants: Laurent Francois Martin, Carlsbad, CA (US); Narendra Dubey, San Francisco, CA (US); Jean Pierre Gehrig, Ayent (CH)

(72) Inventors: Laurent Francois Martin, Carlsbad, CA (US); Narendra Dubey, San Francisco, CA (US); Jean Pierre Gehrig, Ayent (CH)

(73) Assignee: Laurent Francois Martin, Carlsbad, CA (US)

( * ) Notice: Subject to any disclaimer, the term of this patent is extended or adjusted under 35 U.S.C. 154(b) by 123 days.

(21) Appl. No.: 16/235,496

(22) Filed: Dec. 28, 2018

(65) Prior Publication Data
US 2019/0204155 A1    Jul. 4, 2019

Related U.S. Application Data

(60) Provisional application No. 62/621,089, filed on Dec. 29, 2017.

(51) Int. Cl.
*G01J 3/46* (2006.01)
*G06T 7/90* (2017.01)
*G06T 11/00* (2006.01)
*G06T 11/60* (2006.01)

(52) U.S. Cl.
CPC ............... *G01J 3/462* (2013.01); *G01J 3/463* (2013.01); *G06T 7/90* (2017.01); *G06T 11/001* (2013.01); *G06T 11/60* (2013.01)

(58) Field of Classification Search
CPC .. G01J 3/462; G01J 3/463; G06T 7/90; G06T 11/001; G06T 11/60; G06K 9/6217; G06K 9/00268
See application file for complete search history.

(56) References Cited

U.S. PATENT DOCUMENTS

| 2005/0220345 A1* | 10/2005 | Chiu ..................... G06F 16/786 382/190 |
| 2009/0202170 A1* | 8/2009 | Weiss ................... G06K 9/4652 382/275 |
| 2017/0294032 A1* | 10/2017 | Mantuano ............... G06T 11/40 |

* cited by examiner

*Primary Examiner* — Leon Viet Q Nguyen
(74) *Attorney, Agent, or Firm* — Mannava & Kang, P.C.; Vinay Malik

(57) ABSTRACT

Embodiments herein disclose automated methods and systems to fill background and interstitial space in the visual object layout with one or more colors that bleed/blend into each other. Embodiments herein automate the creation of multi-colored backgrounds for filling the interstitial space.

10 Claims, 10 Drawing Sheets

FIG. 1
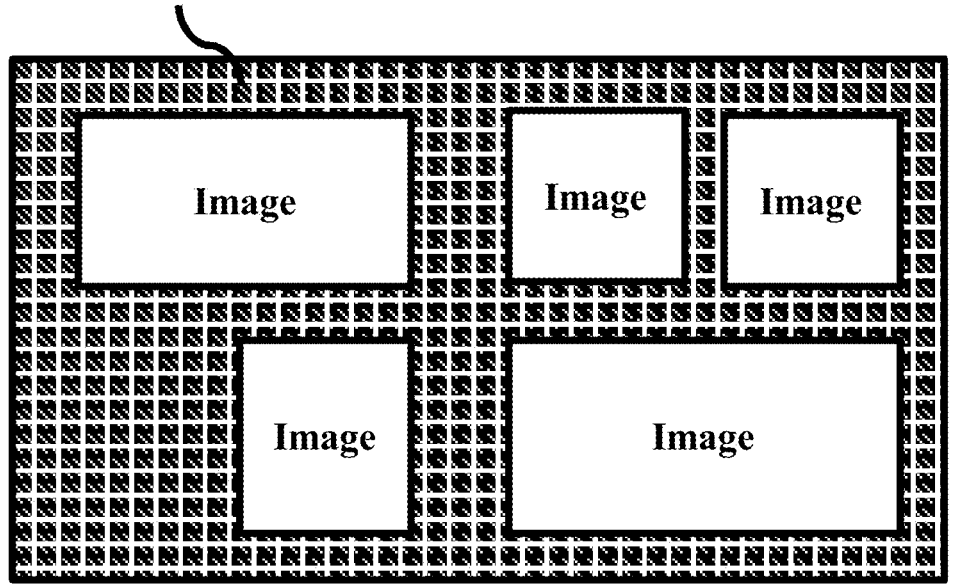
 = Interstitial space

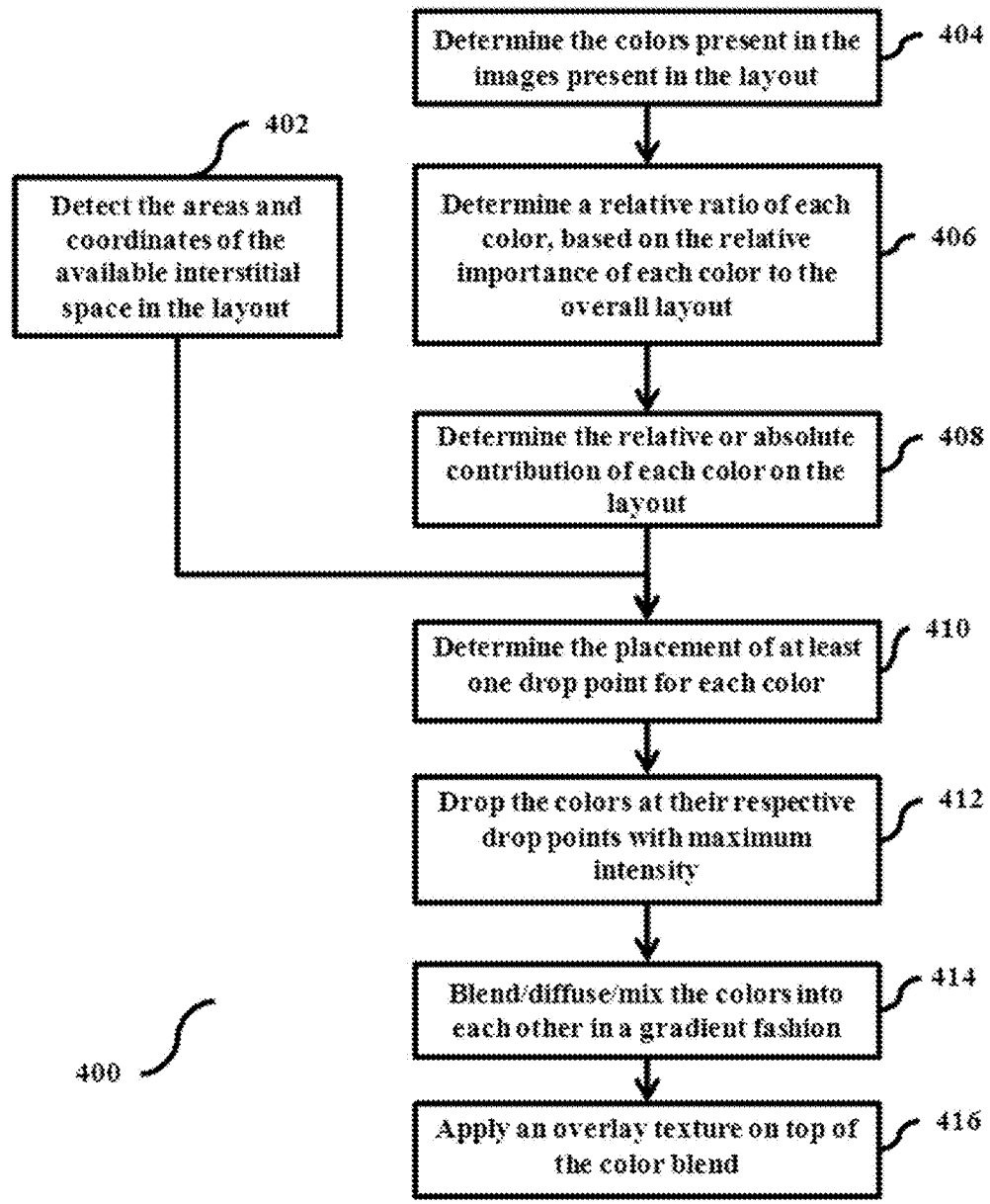

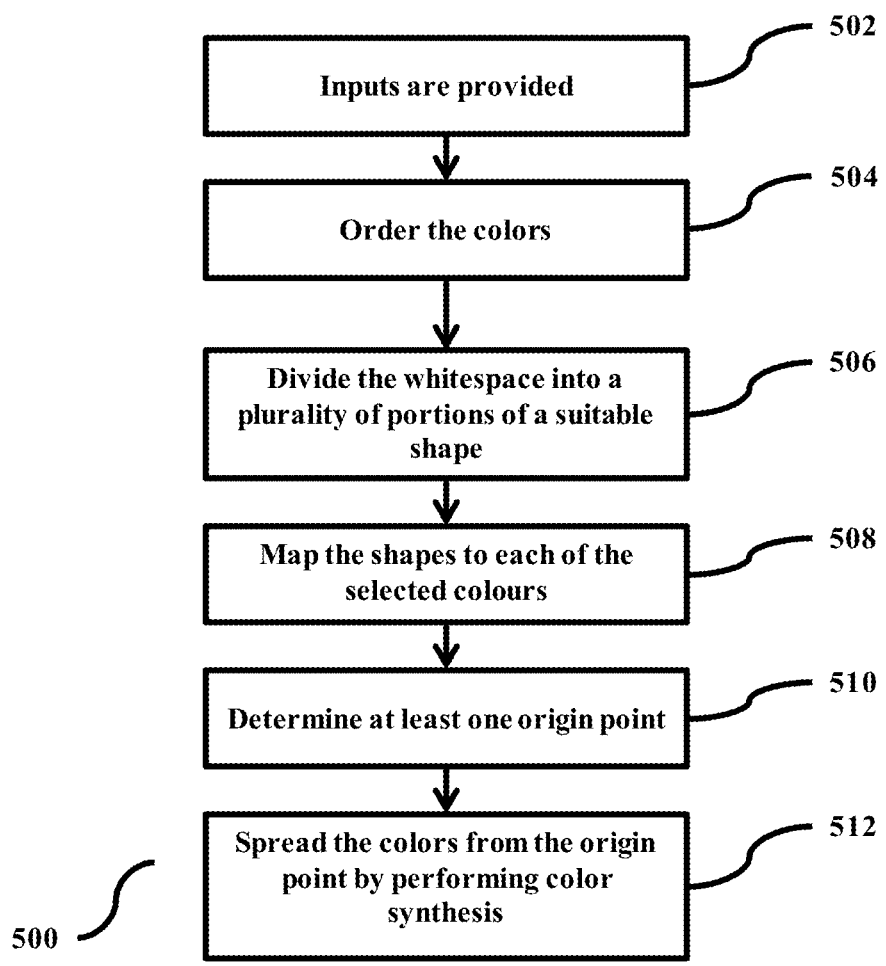

AUTOMATED METHODS AND SYSTEMS TO FILL BACKGROUND AND INTERSTITIAL SPACE IN A VISUAL OBJECT LAYOUT

CROSS REFERENCE TO RELATED APPLICATION

This application is based on and derives the benefit of U.S. Provisional Application 62/612,089 the contents of which are incorporated herein by reference.

TECHNICAL FIELD

The embodiments herein relate to visual graphic design and layouts and, more particularly, to filling background and interstitial space in a layout

BACKGROUND

Given a visual layout of 1 to n photos on a surface area, there is a design challenge in filling space, which is left unoccupied by the photos (hereinafter referred to as interstitial space) (as depicted in the example in FIG. 1). This remaining interstitial space could be filled by a color background with a single color or a blend of more than one color. The display and mixing/blending of these colors to fill the interstitial space is non-trivial. All the chosen colors need to appear in the interstitial space without getting buried behind the overlaid photos. Also, the colors need to have smooth gradients when bleeding into each other.

BRIEF DESCRIPTION OF THE FIGURES

The embodiments disclosed herein will be better understood from the following detailed description with reference to the drawings, in which:

FIG. 1 depicts an example of whitespace in a page where one or more images have been placed;

FIG. 4 is a flowchart depicting the process of determining at least one content aware sticker that can be applied onto a layout, according to embodiments as disclosed herein;

FIG. 5 is a flowchart depicting the process of filling background and interstitial space in a visual object layout, according to embodiments as disclosed herein.

DETAILED DESCRIPTION OF EMBODIMENTS

Figure 2A:
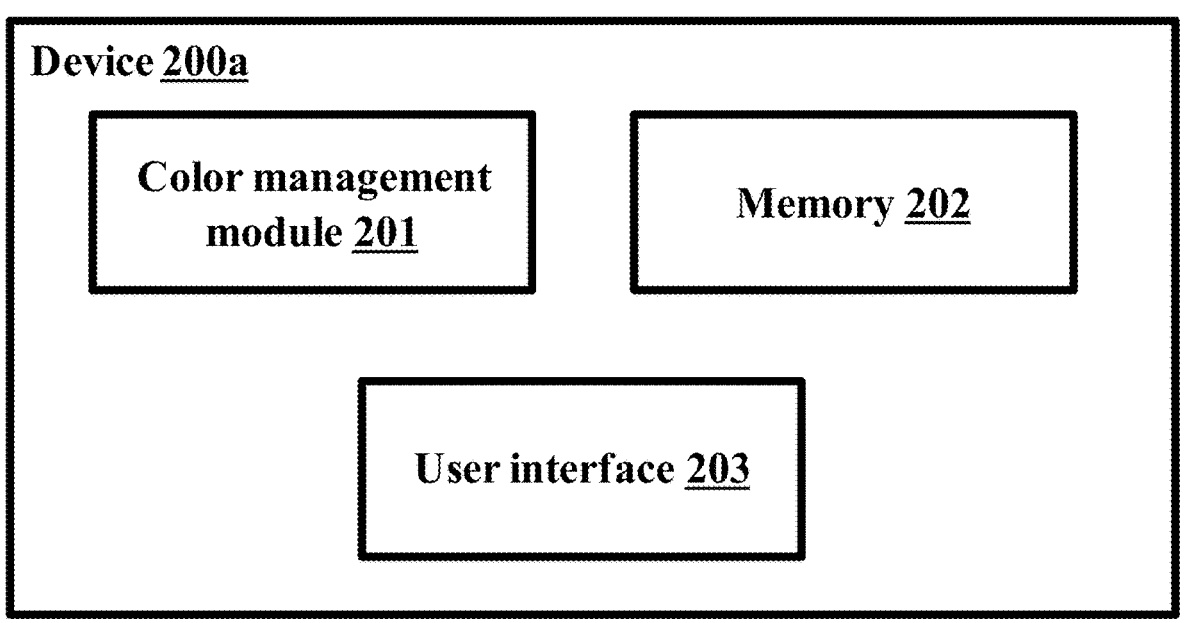
FIGS. 2A, and 2B depict a system for determining at least one content aware sticker that can be applied onto a layout, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose automated methods and systems to fill background and interstitial space in a visual object layout. Referring now to the drawings, and more particularly to FIGS. 2A through 6D, where similar reference characters denote corresponding features consistently throughout the figures, there are shown embodiments.

'Layout' as referred to herein can be a 'base' or 'background' 2-D geometric surface of any suitable shape, wherein one or more geometric objects are overlaid on the layout. Layouts can be a combination of at least one of statically pre-determined layouts and dynamically generated layouts (wherein the dynamically generated layout can be dynamically generated at runtime). Layouts can comprise of different categories (also referred to herein as spread), such as front cover, back cover, first inside page, last inside page, one-page left, one-page right, two-page layout, 2-page layout crease compatible, and so on. Each layout can comprise of a configurable number of wells, wherein objects can be placed into the wells present in the layout. The layout can be of a pre-defined aspect ratio (H×W). The aesthetic characteristic of a layout can be described using a multi-dimensional vector, hereinafter referred to as an aesthetic vector. Examples of the geometric objects can be, but not limited to, rectangles, squares, circles, diamonds, and so on. Embodiments herein have used the terms 'layout', 'canvas' to indicate the layout interchangeably.

'Object' as referred to herein can refer to a 2-dimensional geometric object, which can be placed on a layout. In an embodiment herein, the user can provide the objects in real-time. In an embodiment herein, the objects can be fetched from a pre-defined location such as a local or remote database, a local file system, a remote file server, a data server, cloud storage, and so on. In an embodiment herein, a user can place one or more objects on the layout. In an embodiment herein, one or more objects can be placed automatically on the layout. Examples of the object can be, but not limited to, photos/images, paintings, sketches, drawings, graphic art, clip art, stickers, text, decorative text, and so on. Embodiments herein use an image as an example of an object for ease of explanation, however, it may be obvious to a person of ordinary skill in the art that embodiments as disclosed herein can be extended to any other type of object.

A layout can comprise one or more objects placed on one or more locations in the layout. The space in between the objects is referred to herein as interstitial space.

Embodiments herein disclose automated methods and systems to fill background and interstitial space in the visual object layout with one or more colors that bleed/blend into each other. Embodiments herein automate the creation of multi-colored backgrounds for filling the interstitial space.

Figure 2B:
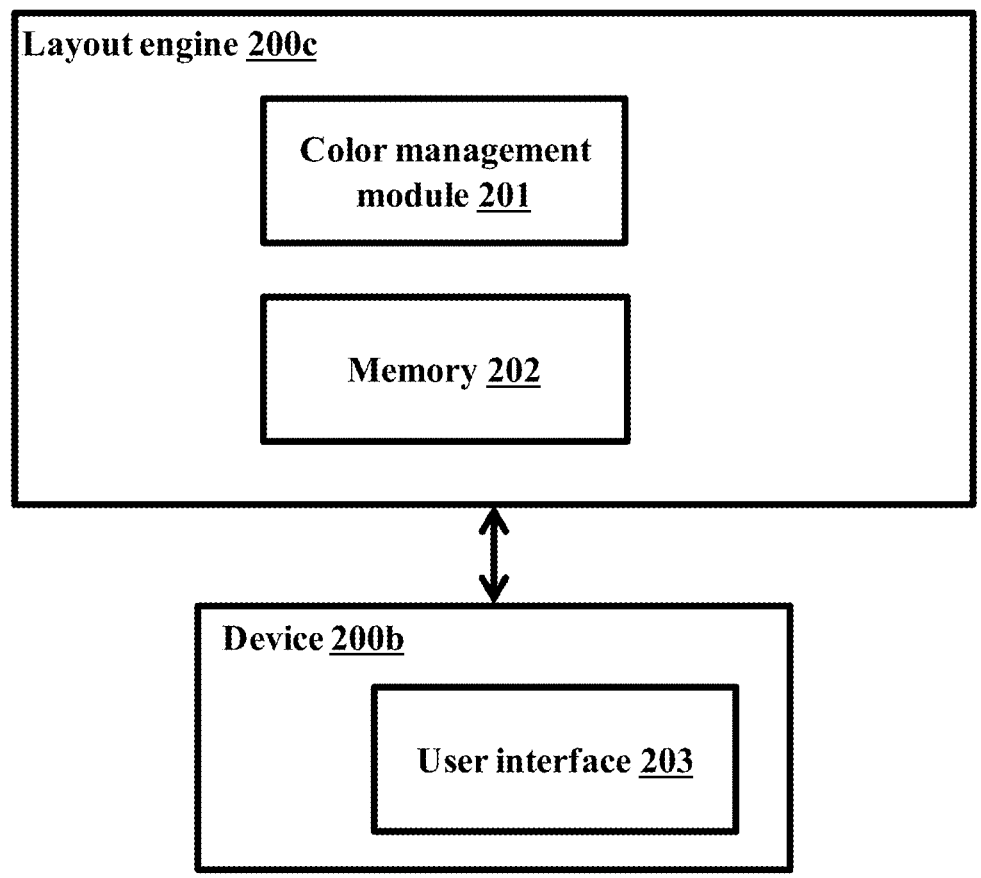

FIGS. 2A, and 2B depict a system for determining at least one content aware sticker that can be applied onto a layout. The system 200, as depicted in FIG. 2A, can comprise a device 200a, which can further comprise a color management module 201, a memory 202, and at least one user interface 203. Examples of the device 200a can be, but not limited to, a laptop, a computer, a mobile phone, a tablet, a smart phone, an Internet of Things (IoT) device, a wearable computing device, a server, and so on.

The system 200, as depicted in FIG. 2B, can comprise a device 201b comprising at least one user interface 203. The device 200b can be connected to a layout management engine 200c using at least one of a wired means and/or a wireless means. Examples of the layout management engine 200c can be, but not limited to, a database, a file system, a server, a file server, a data server, the Cloud, and so on. The layout engine 200c can further comprise color management module 201, and a memory 202.

The user interface 203 can enable the user and/or an authorized user (such as an administrator) to provide at least one input to the image analysis module 201. Considering an example of a user, the user may provide at least one image, at least one label that can be used to describe the image, using the user interface 203. Examples of the user interface 203 can be, but not limited to, a display, a touchscreen, a keyboard, a mouse, and so on. The label can be at least one of a word, a phrase, a sentence, a paragraph, and so on.

The memory 202 can comprise a plurality of layouts, one or more images to be placed in the layouts, layouts with one or more images placed in it.

The color management module 201 can detect the areas and coordinates of the available interstitial space in any layout. The color management module 201 can determine the colors present in the images present in the layout. The color management module 201 can determine the locations of each color in the layout. The color management module 201 can determine the dominance of the colors, present in the images present in the layout. The color management module 201 can use any suitable means such as image analysis, color analysis and so on. Examples of the criterion for color selection can be at least one of, but not limited to, colors that occupy most area of the occupies, colors that draws the eye of the user the most (visual mass), the most vibrant colors, and so on.

The color management module 201 can determine the relative or absolute contribution of each color on the layout. For example, if the colors red, blue and yellow are being added to the layout; their relative contribution is set. Blue may be set as the dominant color at 50%, yellow may be set at 30% and red may be set at 20% and be the minority color. These relative contributions could be derived from the photos that are present in that specific layout in some ratio or proportion.

On detecting the areas and coordinates of the available interstitial space in the layout and the colors present in the layout, the color management module 201 can determine one or more coordinates (points) where the colors have to be dropped (hereinafter referred to as drop points), wherein these drop points are the locations/co-ordinates where the color intensity is the maximum for a given color specification in RGB, CMYK or any other color space. The placement of the drop point can be based on the colors present in the layout. For example, a green background color can have a drop point close to where the grass is seen in the photos and the drop point of a blue color can be close to where the sky is seen in the images. Based on the determined placement, the color management module 201 can drop the colors at their respective drop points with maximum intensity.

Once the colors are dropped at their respective drop points, the color management module 201 can blend/diffuse/mix the colors into each other in a gradient fashion. The color management module 201 can use linear or non-linear mathematical functions (such as Linear functions, Quadratic functions, and so on) to control the gradient of diffusions of these colors into each other. Further, the color management module 201 can also decide whether to synthesize the colors between two or more colors and type of gradients as well (for example, linear gradients, radial gradients, and so on).

In an embodiment herein, the color management module 201 can apply other imaging parameters to the colors, such as, but not limited to, hue, saturation, saturation, transparency, brightness, contrast and so on.

In an embodiment herein, once the colors are mixed and bled into each other, the color management module 201 can apply an overlay texture on top of the color blend. In an embodiment herein, the texture can be defined by a user. In an embodiment herein, the color management module 201 can determine the texture to be applied based on the images present in the layout. Examples of the textures can be, but not limited to, effects such as water color, paper, cloth, stone, and so on. In an embodiment herein, the color management module 201 can apply other imaging parameters to the texture, such as, but not limited to, hue, saturation, saturation, transparency, brightness, contrast and so on.

Figure 3:
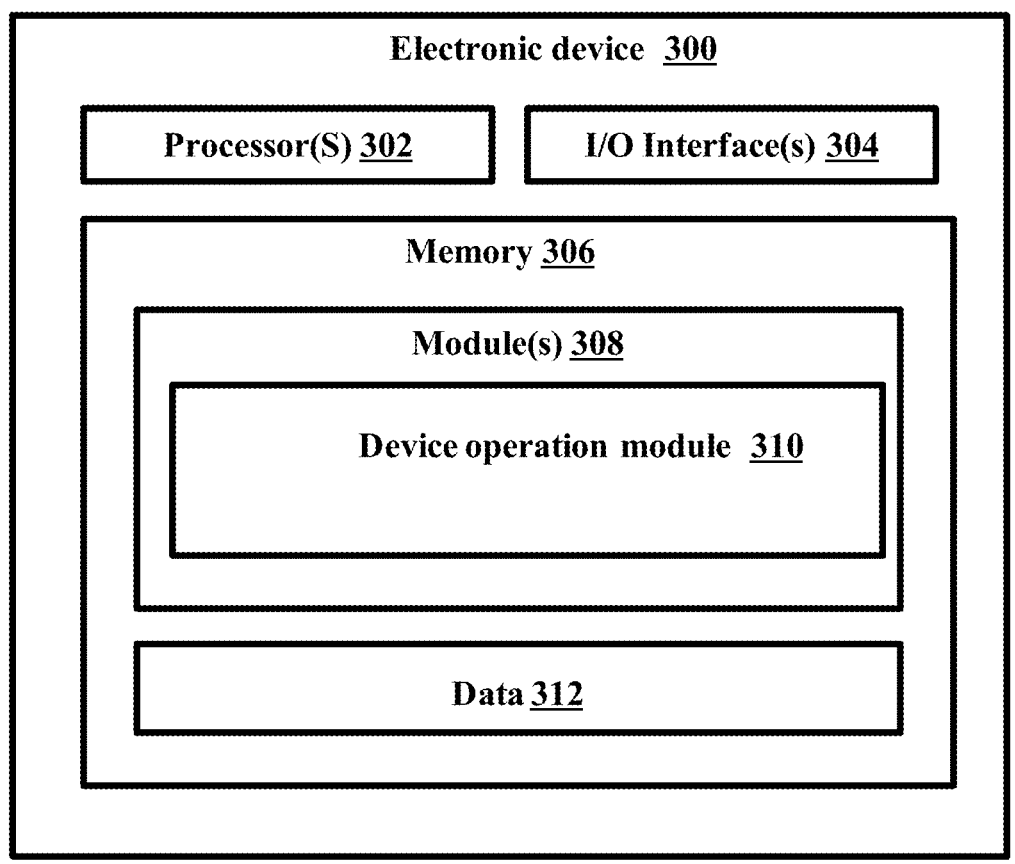
FIG. 3 is a block diagram illustrating a plurality of components of an electronic device 100 for filling background and interstitial space in a visual object layout, according to embodiments as disclosed herein.
Figure 6A:
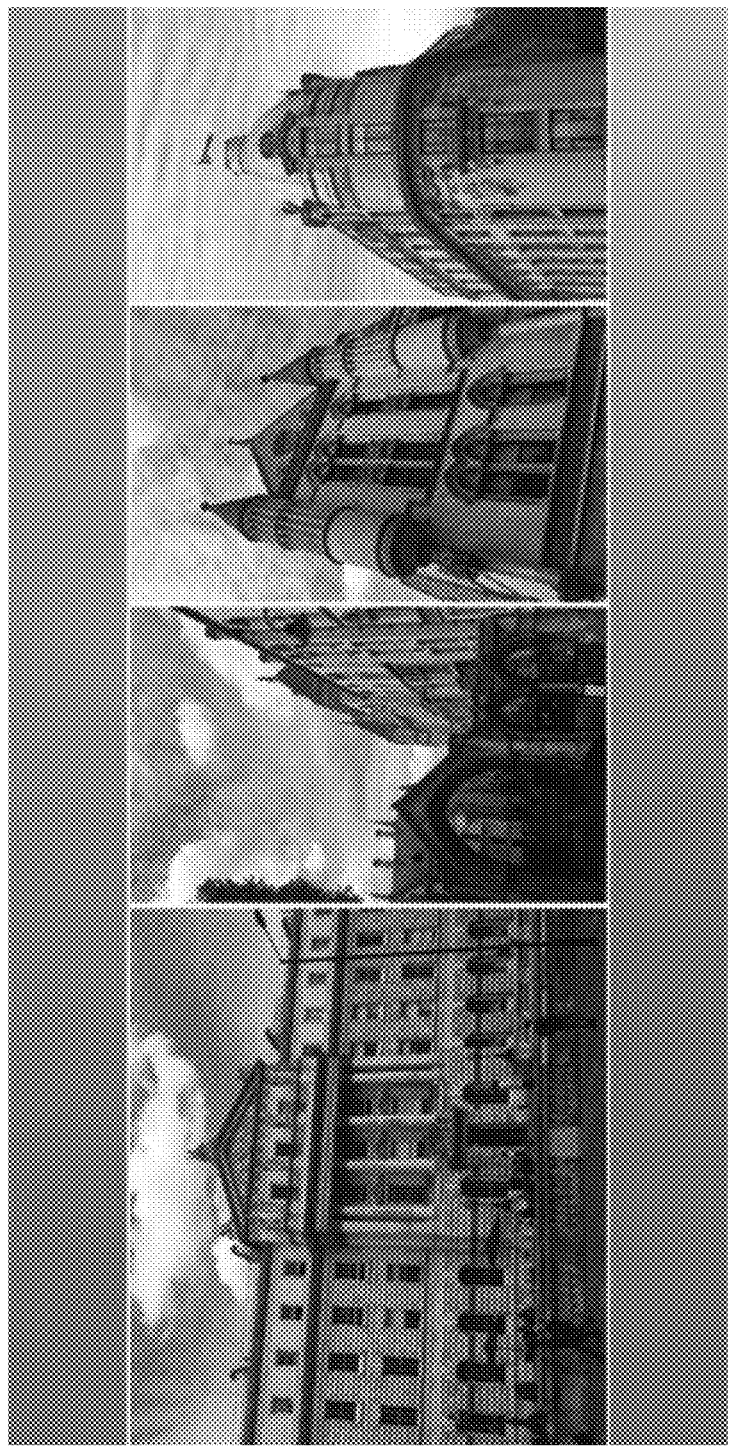
FIGS. 6A, 6B, 6C and 6D depict example layouts, wherein the background and interstitial space in the layout are filled with a plurality of blended colors, according to embodiments as disclosed herein.
Figure 6B:
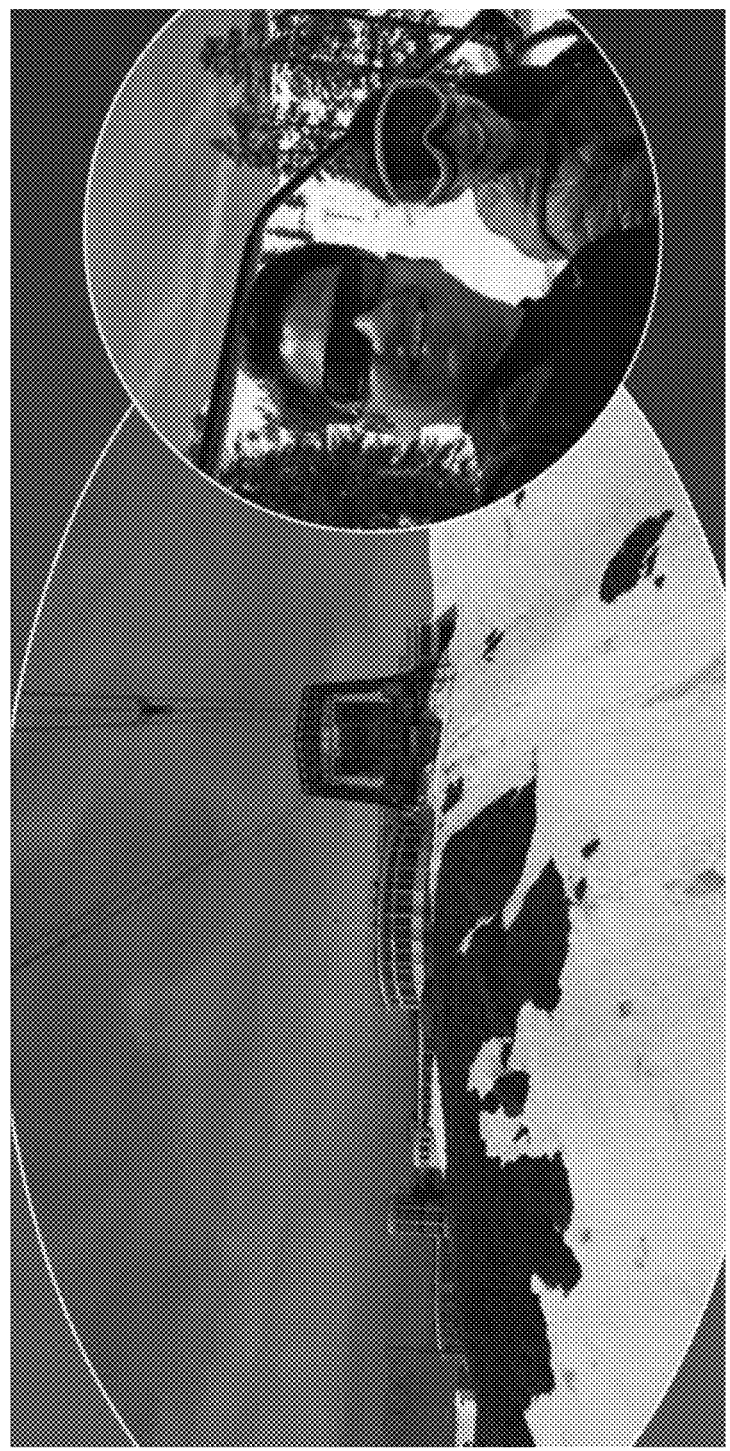
Figure 6C:
Figure 6D:

FIG. 3 is a block diagram illustrating a plurality of components of an electronic device 300 for filling background and interstitial space in a visual object layout. The device 300 can be any device that can create and manage a digital object layout. Examples of the device 300 can be, but not limited to, a computer, a laptop, a smart phone, a mobile phone, a tablet, a wearable device, a server, the Cloud, and so on.

Referring to FIG. 3, the electronic device 300 is illustrated in accordance with an embodiment of the present subject matter. In an embodiment, the electronic device 300 may include at least one processor 302, an input/output (I/O) interface 304 (herein a configurable user interface), and a memory 306. The at least one processor 302 may be implemented as one or more microprocessors, microcomputers, microcontrollers, digital signal processors, central processing units, state machines, logic circuitries, and/or any devices that manipulate signals based on operational instructions. Among other capabilities, the at least one processor 302 is configured to fetch and execute computer-readable instructions stored in the memory 306.

The I/O interface 304 may include a variety of software and hardware interfaces; for example, a web interface, a graphical user interface such as a display screen, a physical interface, and the like. The I/O interface 304 may allow the electronic device 300 to communicate with other devices. The I/O interface 304 may facilitate multiple communications within a wide variety of networks and protocol types, including wired networks, for example, Local Area network (LAN), cable, etc., and wireless networks, such as Wireless LAN, cellular, Device to Device (D2D) communication network, Wi-Fi networks and so on. The modules 308 include routines, programs, objects, components, data structures, and so on, which perform particular tasks, functions or implement particular abstract data types. In one implementation, the modules 308 may include a device operation module 310. The device operation module 310 can be configured for filling background and interstitial space in a visual object layout. The device operation module 310 can be configured to execute one or more tasks corresponding to the application on the electronic device 300 in accordance with embodiments as disclosed herein.

The device operation module 310 can detect the areas and coordinates of the available interstitial space in the layout, once one or more objects have been placed in the layout. Once the interstitial spaces are detected/defined, device operation module 310 can select colors that can appear in the interstitial space. In an embodiment herein, the user can define the colors. In an embodiment herein, the device operation module 310 can select the colors based on factors such as size of the objects, color and shading of the objects, placement of the objects, available interstitial space, and so on. The device operation module 310 can ensure that all the selected colors need to appear in the interstitial space without getting completely buried behind the overlaid photos.

The device operation module 310 can determine the coordinates where the colors are to be dropped (hereinafter referred to as drop points) in the interstitial spaces. These drop points are the locations where the color intensity is the maximum for a given color specification in RGB, CMYK, or any other color space. For example, a green background color could be dropped close to where the grass is seen in the photos and a blue color could be dropped close to where the sky is seen in the photos.

Once the colors are dropped at the drop points with maximum intensity, the device operation module 310 can blend/diffuse/mix the colors into each other in a gradient. The device operation module 310 can create the gradient in a visually pleasing way. Once the colors are mixed and bled into each other, the device operation module 310 can apply an overlay texture can be applied on top of the color blend. Examples of the textures can be, but not limited to, water color, paper, cloth and so on.

The modules 308 may include programs or coded instructions that supplement applications and functions of the electronic device 300. The data 312, amongst other things, serves as a repository for storing data processed, received, and generated by one or more of the modules 308. Further, the names of the other components and modules of the electronic device 300 are illustrative and need not be construed as a limitation.

The memory 306 may include one or more computer-readable storage media. The memory 306 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 306 may, in some examples, be considered a non-transitory storage medium. The term "non-transitory" may indicate that the storage medium is not embodied in a carrier wave or a propagated signal. However, the term "non-transitory" should not be interpreted to mean that the memory 306 is non-movable. In some examples, the memory 306 can be configured to store larger amounts of information than the memory. In certain examples, a non-transitory storage medium may store data that can, over time, change (e.g., in Random Access Memory (RAM) or cache).

FIG. 3 shows exemplary units of the device(s), but it is to be understood that other embodiments are not limited thereon. In other embodiments, the device(s) may include less or more number of units. Further, the labels or names of the units are used only for illustrative purpose and does not limit the scope of the embodiments herein. One or more units can be combined together to perform same or substantially similar function in the device.

FIG. 4 is a flowchart depicting the process of determining at least one content aware sticker that can be applied onto a layout. The color management module 201 detects (402) the areas and coordinates of the available interstitial space in any layout. The color management module 201 determines (404) the colors present in the images present in the layout, the locations of each color in the layout and the dominance of the colors, present in the images present in the layout. The color management module 201 can use any suitable means such as image analysis, color analysis and so on. The color management module 201 determines (406) a relative ratio of each color, based on the relative importance of each color to the overall layout. The color management module 201 determines (408) the relative or absolute contribution of each color on the layout. These relative contributions could be derived from the photos that are present in that specific layout in some ratio or proportion. The color management module 201 determines (410) the placement of at least one drop point for each color, wherein these drop points are the locations/co-ordinates where the color intensity is the maximum for a given color specification in RGB, CMYK or any other color space. The placement of the drop point can be based on the colors present in the layout. The colors to be placed can be the colors which are considered as more important (i.e., which have a higher contribution to the layout) and the drop points can be the locations where the respective color is predominantly present in the images in the layout. Based on the determined placement, the color management module 201 drops (412) the colors at their respective drop points with maximum intensity. Once the colors are dropped at their respective drop points, the color management module 201 blends/diffuses/mixes (414) the colors into each other in a gradient fashion. The color management module 201 can use linear or linear mathematical functions to control the gradient of diffusions of these colors into each other. In an embodiment herein, the color management module 201 can apply other imaging parameters to the colors, such as, but not limited to, hue, saturation, saturation, transparency, brightness, contrast and so on. Once the colors are mixed and bled into each other, the color management module 201 applies (416) an overlay texture on top of the color blend. In an embodiment herein, the color management module 201 can apply other imaging parameters to the texture, such as, but not limited to, hue, saturation, saturation, transparency, brightness, contrast and so on. The various actions in method 400 may be performed in the order presented, in a different order or simultaneously. Further, in some embodiments, some actions listed in FIG. 4 may be omitted.

FIG. 5 is a flowchart depicting the process of filling background and interstitial space in a visual object layout. In step 502, inputs are provided. The inputs can comprise of the colors selected for blending, the area that each color should copy in the whitespace (which can be in terms of percentage), and so on. The colors can comprise of at least one vibrant color. In step 504, the colors can be ordered. Here, the vibrant colors can have a higher priority. The colors can be ordered according to their gravity; for example, blue, which can represent the sky can be placed in the top portion of the layout and green and brown which can represent the ground and grass can be placed in the bottom portion of the layout. The colors can be labeled accordingly. In step 506, the whitespace can be divided into a plurality of portions of a suitable shape, such as a square, rectangle, quadrilateral, and so on. The number of shapes need not be equal to the number of selected colors. In step 508, the shapes are mapped to each of the selected colors. This mapping can depend on factors such as the area that each color should copy in the whitespace, the labels, axially aligned, and so on. In step 510, at least one origin point is determined; wherein the origin point is the point from where the color needs to start to spread out is determined, with respect to the corresponding shape. This point can be outside the shape and the color can radiate outwards from this point. In step 512, the colors are spread from the selected origin point by performing color synthesis. The intensity of reduction in the radiation of the color can be determined. The various actions in method 500 may be performed in the order presented, in a different order or simultaneously. Further, in some embodiments, some actions listed in FIG. 5 may be omitted.

FIGS. 6A, 6B, 6C and 6D depict example layouts, wherein the background and interstitial space in the layout are filled with a plurality of blended colors.

Embodiments herein can be used in the creation of a coffee table photo book, digital photo narrative with photo layouts, a calendar, a collage, a power point presentation, a poster, a greeting card, and so on.

The embodiments disclosed herein can be implemented through at least one software program running on at least one hardware device and performing network management functions to control the network elements. The network elements shown in FIG. 1 include blocks, which can be at least one of a hardware device, or a combination of hardware device and software module.

Embodiments disclosed herein specify a system for filling background and interstitial space in a visual object layout. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments herein can be practiced with modification within the spirit and scope of the claims as described herein.

What is claimed is:

1. A method for filling interstitial space in a visual object layout, the method comprising:
   detecting, by a color management module, available interstitial space in the layout;
   determining, by the color management module, at least one color present in at least one image present in the layout;
   determining, by the color management module, locations of each determined color in the layout;
   determining, by the color management module, a relative ratio of each determined color, wherein the relative ratio is based on relative importance of each color to the overall layout;
   determining, by the color management module, at least one drop point for at least one color;
   dropping, by the color management module, the determined color at the respective drop points at a maximum intensity; and
   blending, by the color management module, at least one dropped color in a gradient fashion.

2. The method, as claimed in claim 1, wherein the drop points are the locations where the color intensity is the maximum for a given color specification.

3. The method, as claimed in claim 1, wherein the method further comprises using a linear or non-linear function to control at least one gradient of a diffusion of the dropped colors and applying at least one imaging parameter to the blended colors.

4. The method, as claimed in claim 1, wherein the method further comprises applying an overlay texture, by the color management module, on top of the blended colors.

5. The method, as claimed in claim 1, wherein the method further comprises applying at least one imaging parameter to at least one texture.

6. A system for filling interstitial space in a visual object layout, the system configured for:
   detecting available interstitial space in the layout;
   determining at least one color present in at least one image present in the layout;
   determining locations of each determined color in the layout;
   determining a relative ratio of each determined color, wherein the relative ratio is based on relative importance of each color to the overall layout;
   determining at least one drop point for at least one color;
   dropping the determined color at the respective drop points at a maximum intensity; and
   blending at least one dropped color in a gradient fashion.

7. The system, as claimed in claim 6, wherein the drop points are the locations where the color intensity is the maximum for a given color specification.

8. The system, as claimed in claim 6, wherein the system is further configured for using a linear or non-linear function to control at least one gradient of a diffusion of the dropped colors and applying at least one imaging parameter to the blended colors.

9. The system, as claimed in claim 6, wherein the system is further configured for applying an overlay texture on top of the blended colors.

10. The system, as claimed in claim 6, wherein the system is further configured for applying at least one imaging parameter to at least one texture.

* * * * *